(12) United States Patent
Tang

(10) Patent No.: US 10,482,284 B1
(45) Date of Patent: Nov. 19, 2019

(54) IDENTIFYING, MARKING AND ERASING SENSITIVE INFORMATION IN SCREEN CAPTURES FOR DATA LOSS PREVENTION

(71) Applicant: Symantec Corporation, Mountain View, CA (US)

(72) Inventor: Xiaoli Tang, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 137 days.

(21) Appl. No.: 15/659,293

(22) Filed: Jul. 25, 2017

(51) Int. Cl.
*G06F 21/62* (2013.01)
*G06K 9/62* (2006.01)
*G06K 9/46* (2006.01)

(52) U.S. Cl.
CPC ....... *G06F 21/6254* (2013.01); *G06K 9/6212* (2013.01); *G06F 2221/21* (2013.01); *G06K 9/4642* (2013.01)

(58) Field of Classification Search
CPC ............ G06F 21/6254; G06F 2221/21; G06K 9/6212; G06K 9/4642
See application file for complete search history.

(56) References Cited

U.S. PATENT DOCUMENTS

2005/0015723 A1* 1/2005 Light .................... G06Q 10/10
715/271
2009/0164878 A1* 6/2009 Cottrille .............. G06F 21/6245
715/210
2017/0068829 A1* 3/2017 Shaw .................. G06F 21/6281

OTHER PUBLICATIONS

Grabilla, "How to Remove Personal Information From Screenshot?" Jan. 6, 2017 <http://grabilla.com/how-to-remove-personal-information-from-screenshot>, 5 pages.
Screen Capture—Tool to Quickly Hide/Blur/Redact Text in Screenshot? Nov. 9, 2012, <http://apple.stackexchange.com/questions/72971/tool-to-quickly-hide-blur-redact-text-in-as-screenshot>, 5 pages.

* cited by examiner

*Primary Examiner* — Ellen Tran
(74) *Attorney, Agent, or Firm* — Patent Law Works LLP

(57) ABSTRACT

Sensitive information displayed on a screen is protected against leakage and loss. A section of a bitmap containing sensitive information is defined as a protection region. A protection marker identifying the protection region is embedded into the bitmap. The defined protection region is divided into multiple sub-regions, and a separate sub-region protection marker is embedded in each sub-region of the original protection region. The defining, embedding and dividing are performed before the bitmap is copied to the screen buffer. When content that was displayed on the screen has been captured, for example by screen capturing software, the captured content is parsed. All sub-region protection markers embedded in the captured content are detected, and a real protection region in the captured content is calculated, based on information in the detected sub-region protection markers. The sensitive information in the captured content is erased.

20 Claims, 5 Drawing Sheets

IDENTIFYING, MARKING AND ERASING SENSITIVE INFORMATION IN SCREEN CAPTURES FOR DATA LOSS PREVENTION

TECHNICAL FIELD

This disclosure pertains generally to computer security and data loss prevention, and more specifically to identifying, marking and erasing sensitive information from screen captures.

BACKGROUND

With the widespread use of cloud based storage and mobile computing devices, enterprises and other organizations are subject to loss and leakage of their sensitive information, as a result of both inadvertent and malicious user activity. An organization's data loss prevention policy can identify sensitive information, and specify how it may and may not be accessed and used. For example, within a given company certain members of the Human Resources department may be authorized to access personal employee information such as home addresses and social security numbers. However, removing such information from the company, either intentionally or inadvertently, could be a violation of company policy.

When viewing files or other information on screen, sensitive information subject to the organization data loss prevention policy can be displayed. It is often the case that the company policy necessitates that specific users be able to view sensitive information on their screens in order to do their job. However, displaying sensitive information creates the possibility of data leaks. For example, screen capture software can be used to capture the content being displayed, including sensitive information. These screen captures could then be shared, resulting in a leak of sensitive information. In addition, a computer display screen can be photographed (e.g., by a user's phone). The resulting photos are also a potential vector for sensitive information leakage. However, blocking the display of the sensitive information outright is problematic, because as noted above, the organization may require that given parties be able to view the information, but not to capture or photograph it.

It would be desirable to address these issues.

SUMMARY

Sensitive information displayed on a screen is protected against leakage and loss. Sensitive information can be in the form of information which is permissible for an application program to display on a screen during its normal course of operation, but which an organizational policy or the like prohibits from being captured from the display screen. One example of sensitive information according to some embodiments is personal identification information.

A section of a bitmap containing sensitive information is defined as a protection region. Protection regions can be different shapes in different embodiments, for example a rectangle. A protection marker identifying the protection region is embedded into the bitmap. A protection maker can contain, for example, shape, size and location information of the protection region. In different embodiments protection markers can be visible or invisible, For example, invisible markers can be used in the context of using screen capture software to capture content being displayed on the screen, whereas visible markers can be used in the context of using scanning software to capture content that was previously displayed on the screen and, e.g., photographed.

The defined protection region is divided into multiple sub-regions, and a separate sub-region protection marker is embedded in each sub-region of the original protection region. Sub-region protection markers can contain, for example, shape, size and location information of the specific sub-region, and shape, size and location information of the original protection region. The defining, embedding and dividing steps are performed before the bitmap is copied to the screen buffer by the application. In some embodiments, these steps are performed by or otherwise in conjunction with an application that displays sensitive information on the screen. In some embodiments, each time the application processes a bitmap and prepares to load that bitmap into the screen buffer, a protection region containing sensitive information for the given bitmap is defined, and the above described embedding steps are executed.

When content that was displayed on the screen has been captured, for example by screen capturing software, the captured content is parsed. All sub-region protection markers embedded in the captured content are detected, and a real protection region in the captured content is calculated, based on information in the detected sub-region protection markers. Note that in some instances, the calculated real protection region in the captured content is not identical to the original protection region, as a result of on-screen content overlapping or clipping. In other instances, the original protection region has not been damaged, and the calculated protection region is identical thereto. Regardless, the sensitive information in the captured content can be erased, thereby protecting the sensitive information. For example, a specific message indicating that protected sensitive information has been erased can be written over at least a part of the real protection region. In other embodiments, the sensitive information in the real protection region can be redacted by overwriting the region with a solid color or other graphical data. In some embodiments, the above described parsing, detecting, calculating and erasing steps are performed by or otherwise in conjunction with screen capture software or scanning software.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
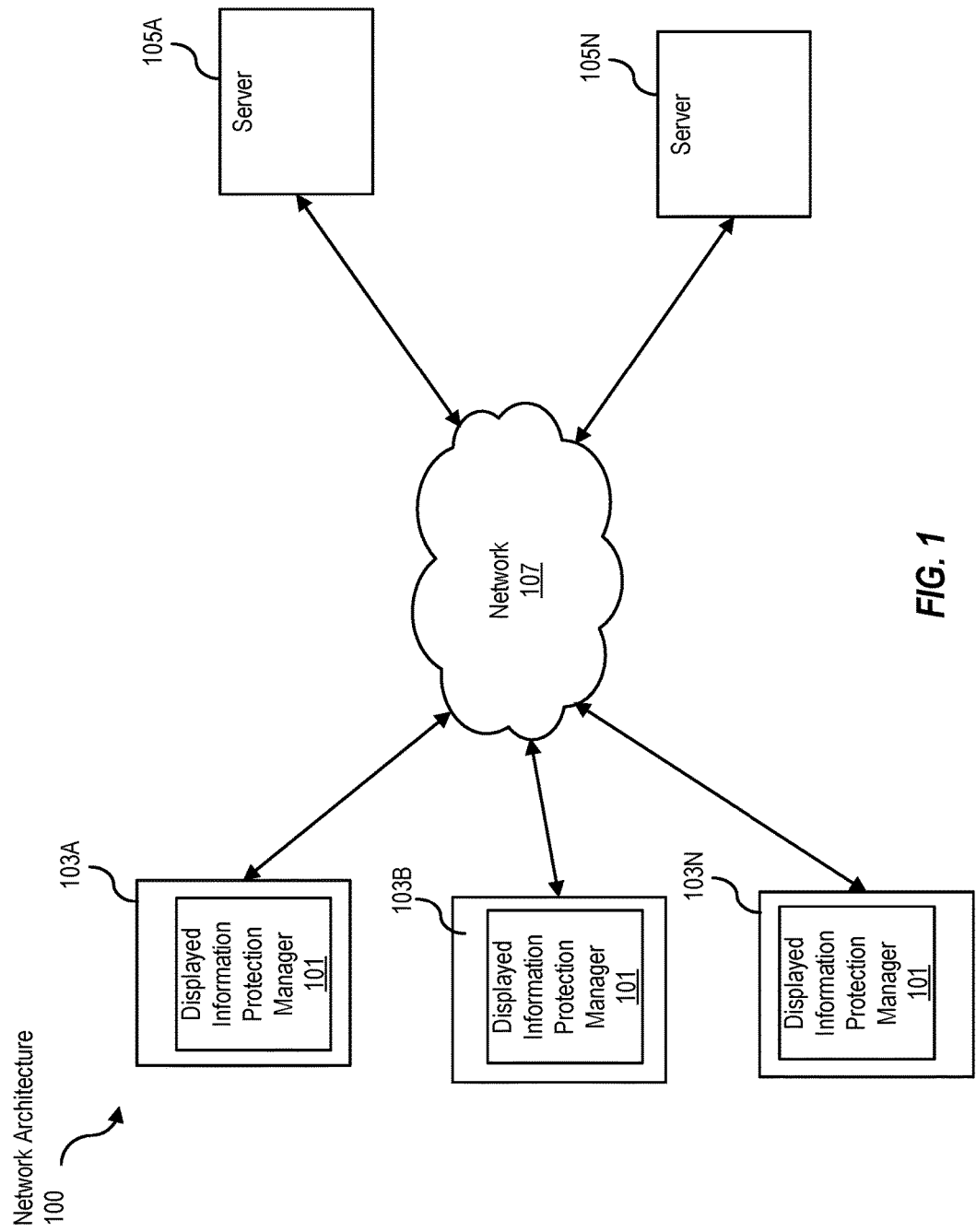
FIG. 1 is a block diagram of an exemplary network architecture in which a displayed information protection manager can be implemented, according to some embodiments.

FIG. 1 is a block diagram illustrating an exemplary network architecture 100 in which a displayed information protection manager 101 can be implemented. The illustrated network architecture 100 comprises multiple clients 103A, 103B and 103N, as well as multiple servers 105A and 105N. In FIG. 1, a displayed information protection manager 101 is illustrated as residing on each client 103A-C. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications (e.g., smartphones, tablet computers, wearable computing devices, etc.).

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
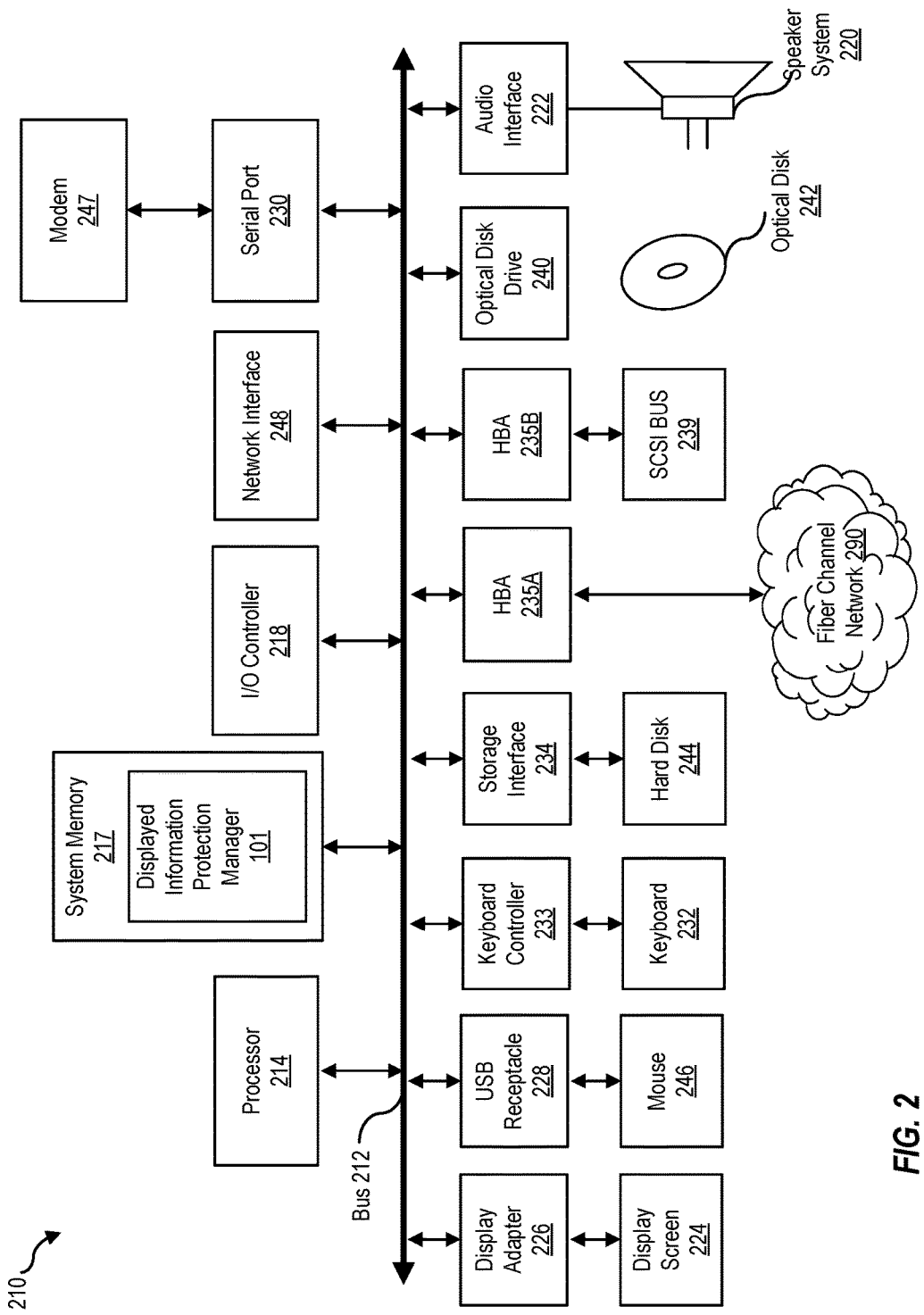
FIG. 2 is a block diagram of a computer system suitable for implementing a displayed information protection manager, according to some embodiments.

FIG. 2 is a block diagram of a computer system 210 suitable for implementing a displayed information protection manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the displayed information protection manager 101 is illustrated as residing in system memory 217. The workings of the displayed information protection manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
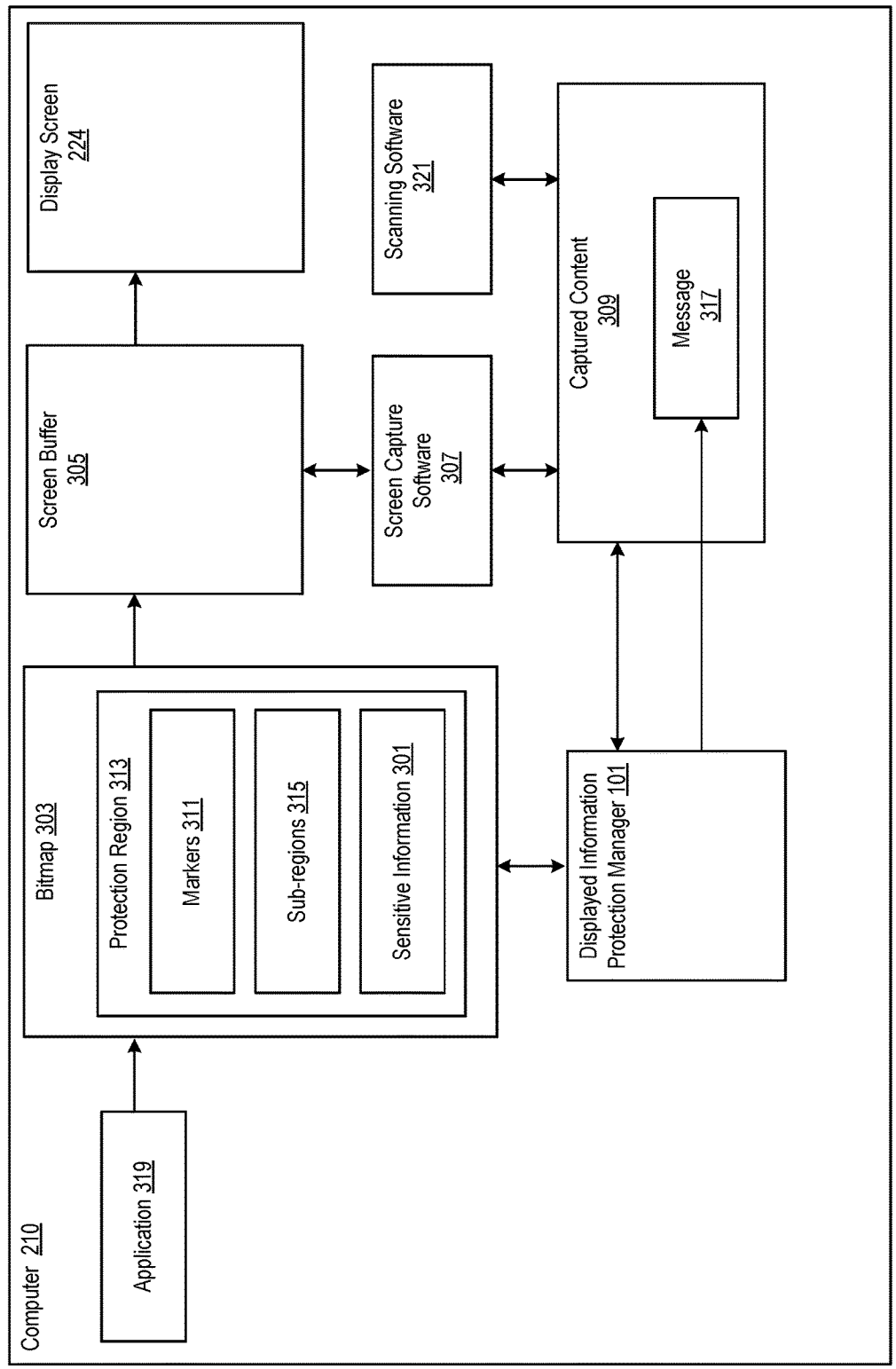
FIG. 3 is a block diagram of the operation of a displayed information protection manager, according to some embodiments.

FIG. 3 illustrates the operation of a displayed information protection manager 101, according to some embodiments. As described above, the functionalities of the displayed information protection manager 101 can reside on a client 103, a server 105, or be distributed between multiple computer systems 210, including within a cloud-based computing environment in which the functionality of the displayed information protection manager 101 is provided as a service over a network 107.

As illustrated in FIG. 3, a displayed information protection manager 101 runs on an endpoint computer 210 (e.g., a client 103), and prevents loss of sensitive information 301 displayed on the screen 224. More specifically, as described in detail below, the displayed information protection manager 101 identifies and tags and sensitive information in a bitmap 303 before it is copied into the screen buffer 305, and then erases the sensitive information 301 from screen captures. When an application 319 running on a computer 210 displays text and images on the screen 224, these data are converted into a bitmap 303 and copied into the screen buffer 305, which is an area of computer memory 217. The bitmap 303 in the screen buffer 305 drives the video output to the screen 224, with a given number of bits representing the color and in some cases other attributes of each pixel. The size of the screen buffer 305 is a function of the resolution and color depth. When the contents of the bitmap 303 in the screen buffer 305 is updated 305, the content displayed on the screen 224 is updated according.

Screen capture software 307 operates by copying all or a section of the bitmap 303 from the screen buffer 305 to a separate location in memory 217, and then processing the captured content 309 as desired, e.g., print, save to a file, transmit to a remote computer 210, etc. Many applications use screen capture functionality, for example the Windows print screen feature, WebEx, Remote Desktop, etc. The captured content 309 can be subsequently shared with other people, thereby risking inadvertent or malicious unauthorized leakage of data from an organization.

To prevent such data leakage, the displayed information protection manager 101 identifies sensitive information 301 in a bitmap 303, and embeds into the bitmap 303 a marker 311 which contains size and location information of the region 313 containing the sensitive information 301, before the bitmap 303 is copied into the screen buffer 305. In order to protect against losing the marker 311 due to the overlapping of windows on the screen 224 or the clipping of content covering only a part of the screen 224, the displayed information protection manager 101 divides the region 313 containing the sensitive information 301 into a set of sub-regions 315, and embeds a separate marker 311 into each one. Thus, even when only a section of the screen 224 is clipped or visible, the region 313 containing sensitive information 301 can still be identified. The displayed information protection manager 101 can then identify and erase the text and/or images in the protection region 313 after the bitmap 303 is copied from the screen buffer 305 by screen capture software 307. Thus, the captured content 309 does not contain the sensitive information 301. Furthermore, the displayed information protection manager 101 can replace the redacted sensitive information 301 in the captured content 307 with a message 317 indicating that the redacted content is protected.

Figure 4:
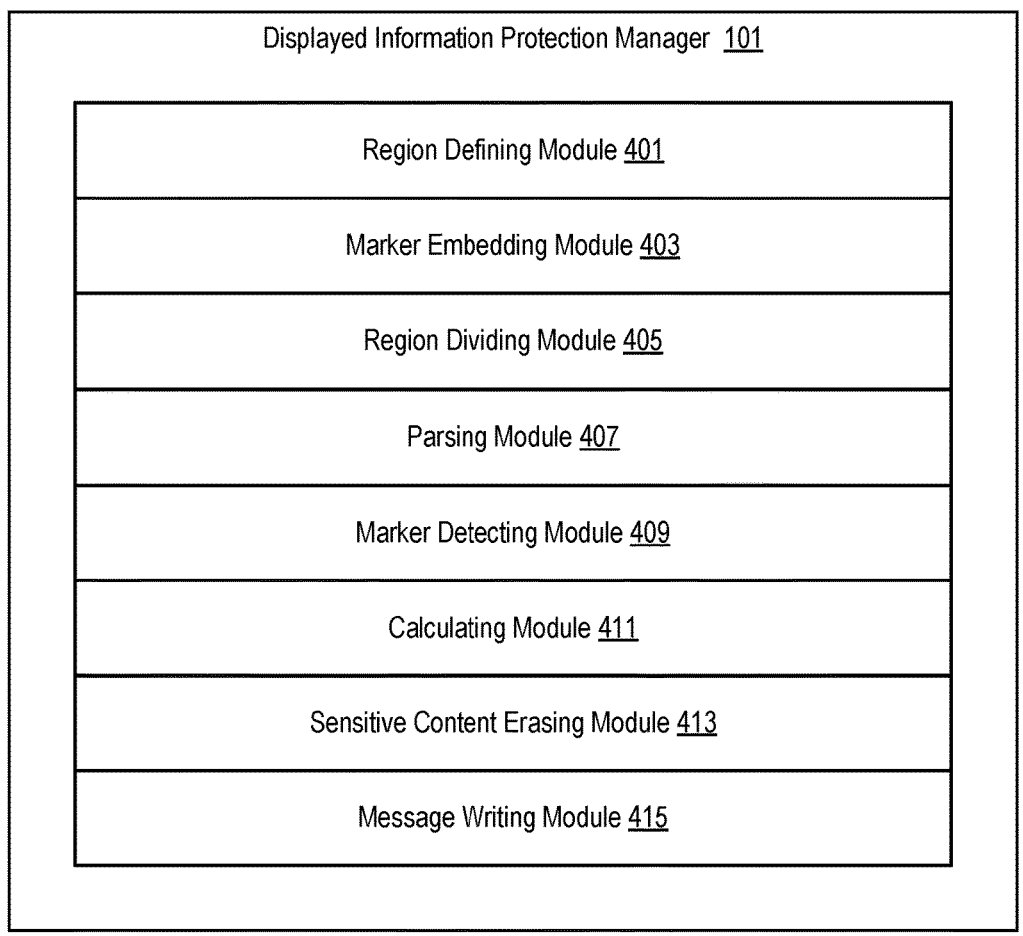
FIG. 4 is a block diagram of a displayed information protection manager, according to some embodiments.

FIG. 4 illustrates a specific multiple module instantiation of a displayed information protection manager 101, according to some embodiments. It is to be understood that although the displayed information protection manager 101 is illustrated as a single entity, the illustrated displayed information protection manager 101 represents a collection of functionalities, which can be instantiated as a single or multiple modules as desired (an instantiation of specific, multiple modules of the displayed information protection manager 101 according to one embodiment is illustrated in FIG. 4). It is to be understood that the modules of the displayed information protection manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the displayed information protection manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 5:
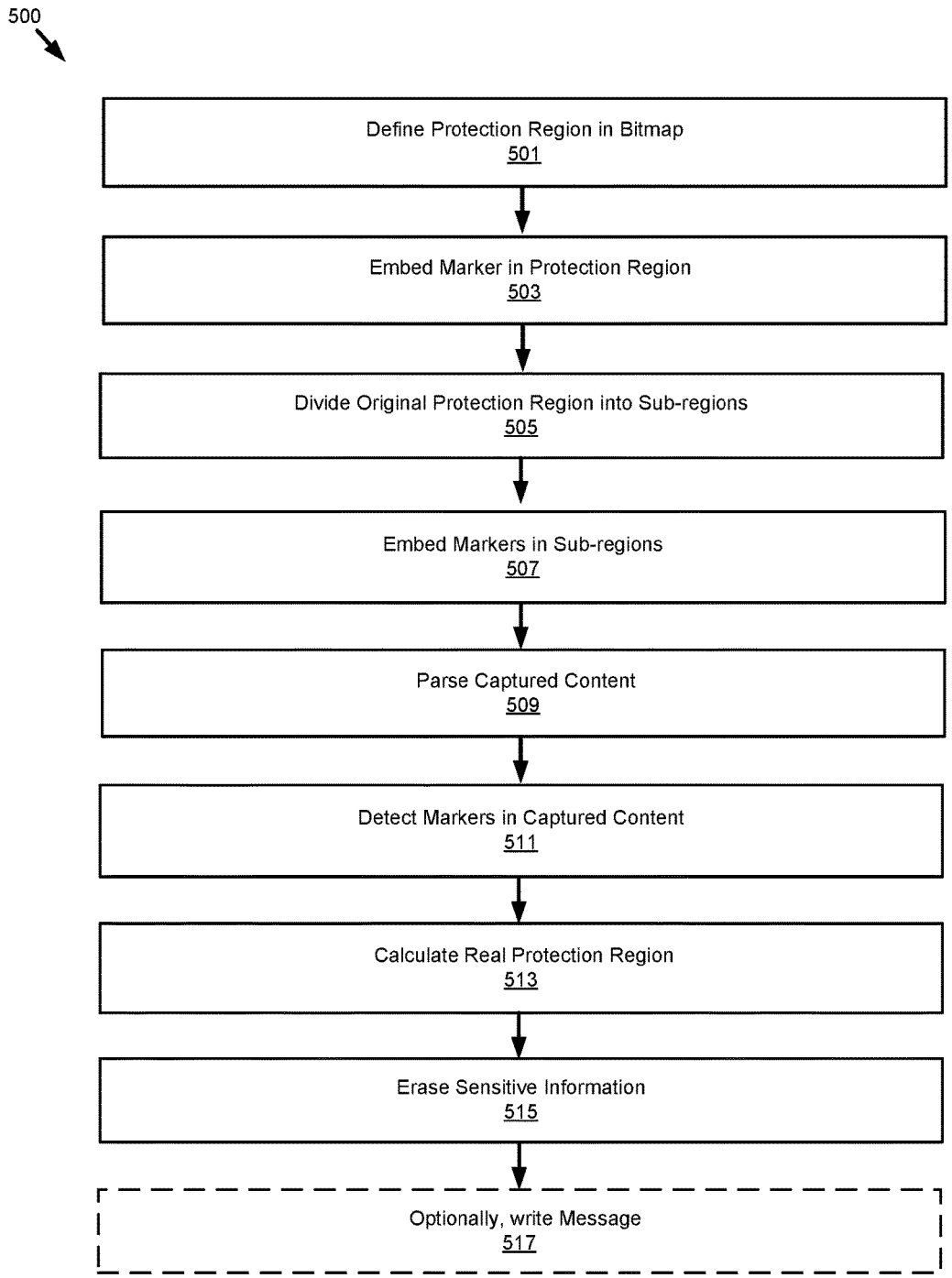
FIG. 5 is a flowchart illustrating steps performed by a displayed information protection manager, according to some embodiments.

FIG. 5 illustrates steps executed by the displayed information protection manager 101, according to some embodiments. For clarity of description, the subject matter illustrated in FIGS. 4 and 5 is described together below. A region defining module 401 of the displayed information protection manager 101 can define 501 a region 313 for protection in a bitmap 303. This defined protection region 313 can be the section of a bitmap 303 containing sensitive information 301. It is to be understood that what constitutes sensitive information 301 varies from organization to organization, and can be defined, for example, by a data loss prevention policy of the given organization. One example of the type of data that can be classified as sensitive is personal identification information (e.g., names, addresses, social security numbers, etc.) of employees, customers, clients and the like. Other examples are confidential governmental information, business information, trade secrets, technological specifications, etc. Within an organization, it is not uncommon that a software application 319 running on a computer 210 within an organization's network 107 displays sensitive information 301 during the ordinary course of its operations. To give just one example, a manager in the human resources department may, as a standard part of his or her job duties, operate a software application 319 that displays personal identification information concerning employees of the company. However, it might be the case that while the organization's policy allows this display of sensitive information 301 on the screen 224, it prohibits the capture of this sensitive information 301 from the screen for other purposes (e.g., saving to a file, emailing outside of the company network 107, etc.). In a scenario such as this, the region defining module 401 can identify the region 313 containing the sensitive information 301 of each bitmap 303 processed by the application 319, prior to the application 319 loading that bitmap 303 into the screen buffer 305. The region defining module 401 defines the identified region 313 as being protected. In any given embodiment, the region defining module 401 identifies as sensitive whatever information 301 is displayed by the application 319 on the screen 224, but which the organizational policy (e.g., a data loss protection policy or the like) prohibits from being captured from the display screen 224.

A protection region 313 can be any shape. In one embodiment, the protection region 313 is in the form of a rectangle. It is to be understood that a protection region can comprise some bits that do not themselves comprise sensitive information 301, so long as the sensitive information 301 itself (or in some embodiments a sufficient amount of it to render the remaining amounts unintelligible) is included in the protection region 301. Put another way, in some embodiments a protection region 313 can have an outline or border of non-protected content, for example to create a rectangle or other desired shape.

A marker embedding module 403 of the displayed information protection manager 101 embeds 503 a marker 311 into the bitmap 303, before the bitmap 303 is copied to the screen buffer 305 by the application 319. This marker 311 (called a protection marker 311 herein) typically contains an identifier so that the protection marker 311 itself can be detected in the bitmap 303, as well as shape, size and location information of the protection region 313, so that the protection region 313 can be located and protected. Detection of the protection marker 311, and location and protection of the protection region 313 are described in detail below.

In some embodiments the above-described protection marker 311 is in a format that is not visible to the human eye.

Therefore, although the protection marker 311 is present in the bitmap 303 which is copied to the screen buffer 305, it does not alter the visible image output to the display screen 224, but is instead hidden. In other embodiments, the protection marker 311 can be in a visible format. A hidden protection marker 311 would typically be used in embodiments protecting against screen capture, whereas a visible protection marker 311 is useful for protecting against leakage of sensitive information 301 through pictures taken of the screen 224. It is to be understood that the implementation mechanics of embedding either visible or invisible information into a bitmap 303 are known to those of ordinary skill in the relevant art, and the implementation details of the use of such techniques within the content of the displayed information protection manager 101 will be apparent to those of such a skill level in light of this disclosure.

Using the functionality described above, the displayed information protection manager 101 can identify and define a protection region 313 and embed a corresponding protection marker 311 in the bitmap 303 to protect the sensitive information 301 displayed on the screen 224. However, it should be noted that the protection region 313 containing the sensitive information 301 could be overlapped by other windows or screen content, for example when displayed on the screen 224 in the context of a windowing graphical user interface (GUI). In addition, screen capture software 307 could be used to clip content displayed on just a part of the screen 224 or active window. As a result of such scenarios, the real shape or size of the protection region 313 could be changed. Were this to occur, the real protection region $313_{REAL}$ containing the sensitive information 301 in the captured content 309 would no longer be identical to the original identified/defined protection region $313_{ORIGINAL}$, either because part of the original protection region $313_{ORIGINAL}$ was overlapped by unrelated content from another window or other GUI component, or because only part of the original protection region $313_{ORIGINAL}$ was included in the clipped content. These scenarios might cause the protection marker 311 to be omitted from the resulting real protection region $313_{REAL}$. In addition, these scenarios would cause the shape, size and/or location of the original protection region $313_{ORIGINAL}$ to be altered, and thus even if the protection marker 311 did still exist, the information therein would no longer be accurate. As used herein, the term "real protection region 313real protection region $313_{REAL}$ means the protection region as it exists in the captured content 309. As explained above, because of the possibility of overlapping content on the screen 224 and/or clipping, the real protection region $313_{REAL}$ can, but is not always, altered from the original protection region $313_{ORIGINAL}$ that was defined in the bitmap 303 before it was copied to the screen buffer 305.

To prevent these problems, a region diving module 405 of the displayed information protection manager 101 divides 505 the original protection region $313_{ORIGINAL}$ into a plurality of sub-regions 315. For example, if the original protection region $313_{ORIGINAL}$ is in the form of a rectangle, the original protection region $313_{ORIGINAL}$ can be divided into a grid of smaller rectangles, wherein each smaller rectangle in the grid is a sub-region 315. The marker embedding module 403 then embeds 507 a separate sub-region protection marker $311_{SUB}$ in each sub-region 315 of the original protection region $313_{ORIGINAL}$. Each sub-region protection marker $311_{SUB}$ typically contains an 1) identifier so that it can be detected in the bitmap 303, 2) shape, size and location information of the sub-region 315, and 3) shape, size and location information of the protection region $313_{ORIGINAL}$. As described in detail below, the real protection region $313_{REAL}$ in a screen capture can be located, even where the original protection region $313_{ORIGINAL}$ has been damaged or partially overwritten, based on the multiple sub-region protection markers $311_{SUB}$ which are detected. Note that the sub-region protection markers $311_{SUB}$ close to the borders of real protection region $313_{REAL}$ could be overwritten or damaged, and thus those individual sub-regions 315 might not be detected. Thus, if the size of the sub-regions 315 is too big, discernable sensitive information 301 in some sub-regions 315 could become unprotected. For this reason, the sub-region size should be small enough that failure to detect and redact border sub-regions 315 would not result in the capture of the sensitive information 301.

In some embodiments, the above-described defining of the protection region $313_{ORIGINAL}$, dividing of the protection region $313_{ORIGINAL}$ into sub-regions 315 and/or the embedding of the corresponding markers 311 prior to the bitmap 303 being to copied into the screen buffer 305 can be performed in conjunction with, by or as a part of the application 319 that displays sensitive information 301 on the screen 224.

When screen capture software 307 captures screen content 309, as explained above the captured content 309 is in the form of a bitmap 303, copied from the screen buffer 305. A parsing module 407 of the displayed information protection manager 101 parses 509 the captured content 309. A marker detecting module 409 of the displayed information protection manager 101 detects 511 all of the markers $311_{SUB}$ embedded in the captured content 309 indicative of sub-regions 315. From the multiple sub-regions 315 identified by the detected markers $311_{SUB}$, a calculating module 411 of the displayed information protection manager 101 calculates 513 the real protection region $313_{REAL}$ containing the sensitive information 301 in the captured content. The calculating module 411 is able to use the plurality of sub-regions 315 to calculate 513 the real protection region $313_{REAL}$, even when the original protection region $313_{ORIGINAL}$ was damaged or altered due to clipping or overlapping. In embodiments based on visible markers 311 used to protect against photographing and subsequently scanning screen content containing sensitive information 301, the detection of markers 311 can be performed in conjunction with scanning software 321, as opposed to screen capture software 307.

A sensitive content erasing module 413 of the displayed information protection manager 101 erases 515 the sensitive information 301 from the captured (or scanned) content 309, by overwriting the identified real protection region $313_{REAL}$. This redacts the sensitive information 301 from the captured content 309, while leaving the captured content outside of the real protection region $313_{REAL}$ intact. In some embodiments, the erasing of the sensitive information takes the form of a message writing module 415 of the displayed information protection manager 101 writing 517 a specific message 317 over at least a part of the protection region $313_{REAL}$, indicating that the redacted section of the captured content 309 contained sensitive information 301 which has been erased according to the data protection/management policy of the organization. The specific content of the message 317 is a variable design parameter. In some embodiments, no message is written to the protection region $313_{REAL}$, but instead the sensitive content erasing module 413 overwrites the protection region $313_{REAL}$ with a solid color or other graphical data.

In some embodiments, the above-described marker 311 detection, real protection region $313_{REAL}$ calculation, sensitive information 301 erasure and/or message 317 writing can be performed in conjunction with or as a part of the screen capture software 305 (or scanning software 321). In other embodiments, this functionality can be implemented in the form of or in conjunction with code which is hooked into system or screen capture software, to monitor the clipboard, system APIs, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for protecting data displayed on a screen against loss, the method comprising:
    defining an original protection region in a bitmap, the defined original protection region comprising a section of the bitmap containing sensitive information;
    embedding a protection marker identifying the original protection region into the bitmap, before the bitmap is copied to a screen buffer by an application;
    dividing the defined original protection region into a plurality of sub-regions, before the bitmap is copied to the screen buffer by the application;
    embedding a separate sub-region protection marker in each sub-region of the original protection region, before the bitmap is copied to the screen buffer by the application;
    parsing captured content that was displayed on the screen after the bitmap was copied to the screen buffer;
    detecting one or more unobscured sub-region protection markers embedded in the captured content;
    calculating a real protection region in the captured content, based on information in the detected one or more unobscured sub-region protection markers; and
    erasing the real protection region in the captured content.

2. The method of claim 1 wherein defining an original protection region further comprises:
    defining a rectangular original protection region.

3. The method of claim 1 wherein embedding a protection marker identifying the original protection region into the bitmap further comprises:
    embedding into the bitmap a protection marker containing shape, size and location information of the original protection region.

4. The method of claim 1 wherein embedding a protection marker identifying the original protection region into the bitmap further comprises:
    embedding into the bitmap a protection marker that is not visible when content of the bitmap is displayed.

5. The method of claim 4 further comprising:
    capturing content by screen capture software being displayed on the screen, the content containing the protection marker that is not visible on the screen.

6. The method of claim 1 wherein embedding a protection marker identifying the original protection region into the bitmap further comprises:
    embedding into the bitmap a protection marker that is visible when content of the bitmap is displayed on the screen.

7. The method of claim 6 further comprising:
    capturing content by scanning software, the content having been previously displayed on the screen and containing the visible protection marker.

8. The method of claim 1 wherein embedding a sub-region protection marker in a specific sub-region of the original protection region further comprises:
    embedding a sub-region protection marker containing shape, size and location information of the specific sub-region, and shape, size and location information of the original protection region.

9. The method of claim 1 wherein:
    the defining, dividing and embedding steps are performed by the application.

10. The method of claim 1 wherein calculating a real protection region in the captured content further comprises:
    calculating a real protection region in the captured content that is not identical to the original protection region, as a result of content overlapping or clipping.

11. The method of claim 1 wherein calculating a real protection region in the captured content further comprises:
    calculating a real protection region in the captured content that is identical to the original protection region.

12. The method of claim 1 wherein erasing the real protection region in the captured content further comprises:
    writing a specific message over at least a part of the real protection region, the specific message indicating that protected sensitive information has been erased.

13. The method of claim 1 wherein erasing the real protection region in the captured content further comprises:
    overwriting the real protection region with a solid color or other graphical data.

14. The method of claim 1 wherein:
    the parsing, detecting, calculating and erasing steps are performed by screen capture software.

15. The method of claim 1 wherein:
    the parsing, detecting, calculating and erasing steps are performed by scanning software.

16. The method of claim 1 further comprising:
    identifying a real protection region containing sensitive information for each bitmap processed by the application, prior to the application loading a given corresponding bitmap being processed into the screen buffer.

17. The method of claim 1 further comprising:
    identifying information displayed by the application on the screen, but which an organizational policy prohibits from being captured from the display screen, as sensitive information.

18. The method of claim 1 further comprising:
    identifying personal identification information as sensitive information.

19. At least one non-transitory computer readable-storage medium for protecting data displayed on a screen against loss, the at least one non-transitory computer readable-storage medium storing computer executable instructions that, when loaded into computer memory and executed by at least one processor of a computing device, cause the computing device to perform the following steps:

defining an original protection region in a bitmap, the defined original protection region comprising a section of the bitmap containing sensitive information;

embedding a protection marker identifying the original protection region into the bitmap, before the bitmap is copied to a screen buffer by an application;

dividing the defined original protection region into a plurality of sub-regions, before the bitmap is copied to the screen buffer by the application;

embedding a separate sub-region protection marker in each sub-region of the original protection region, before the bitmap is copied to the screen buffer by the application;

parsing captured content that was displayed on the screen after the bitmap was copied to the screen buffer;

detecting one or more unobscured sub-region protection markers embedded in the captured content;

calculating a real protection region in the captured content, based on information in the detected one or more unobscured sub-region protection markers; and erasing the real protection region in the captured content.

20. A computer system for protecting data displayed on a screen against loss, the computer system comprising:

at least one processor;

system memory configured to store a screen buffer;

a region defining module residing in the system memory, the region defining module being programmed to define an original protection region in a bitmap, the defined original protection region comprising a section of the bitmap containing sensitive information;

a region dividing module residing in the system memory, the region dividing module being programmed to divide the defined original protection region into a plurality of sub-regions, before the bitmap is copied to the screen buffer by an application;

a marker embedding module residing in the system memory, the marker embedding module being programmed to embed a protection marker identifying the original protection region into the bitmap, and to embed a separate sub-region protection marker in each sub-region of the original protection region, before the bitmap is copied to the screen buffer by the application;

a parsing module residing in the system memory, the parsing module being programmed to parse captured content that was displayed on the screen after the bitmap was copied to the screen buffer;

a marker detecting module residing in the system memory, the marker detecting module being programmed to detect one or more unobscured sub-region protection markers embedded in the captured content;

a calculating module residing in the system memory, the calculating module being programmed to calculate a real protection region in the captured content, based on information in the detected one or more unobscured sub-region protection markers; and a sensitive content erasing module residing in the system memory, the sensitive content erasing module being programmed to erase the real protection region in the captured content.

* * * * *